(12) United States Patent
Miki (10) Patent No.: US 12,162,518 B2
(45) Date of Patent: Dec. 10, 2024

(54) DRIVING TAKEOVER APPARATUS BASED ON DRIVER OPERATION AMOUNT AND TAKEOVER OPERATION

(71) Applicant: DENSO CORPORATION, Kariya (JP)

(72) Inventor: Yuki Miki, Kariya (JP)

(73) Assignee: DENSO CORPORATION, Kariya (JP)

( * ) Notice: Subject to any disclaimer, the term of this patent is extended or adjusted under 35 U.S.C. 154(b) by 245 days.

(21) Appl. No.: 17/411,474

(22) Filed: Aug. 25, 2021

(65) Prior Publication Data

US 2021/0380144 A1 Dec. 9, 2021

Related U.S. Application Data

(63) Continuation of application No. PCT/JP2020/011533, filed on Mar. 16, 2020.

(30) Foreign Application Priority Data

Mar. 22, 2019 (JP) ................................ 2019-055029

(51) Int. Cl.
*B60W 60/00* (2020.01)
*B60W 50/00* (2006.01)
*B60W 50/08* (2020.01)
*B60W 50/14* (2020.01)

(52) U.S. Cl.
CPC ...... *B60W 60/0053* (2020.02); *B60W 50/082* (2013.01); *B60W 50/14* (2013.01); *B60W 60/0015* (2020.02); *B60W 60/0057* (2020.02); *B60W 2050/0073* (2013.01); *B60W 2050/143* (2013.01); *B60W 2050/146* (2013.01); *B60W 2540/10* (2013.01); *B60W 2540/12* (2013.01)

(58) Field of Classification Search
None
See application file for complete search history.

(56) References Cited

U.S. PATENT DOCUMENTS

| 2016/0179092 | A1* | 6/2016 | Park ..................... B60W 40/09 701/23 |
| 2016/0325757 | A1* | 11/2016 | Westlund .......... B60W 60/0055 |
| 2017/0212512 | A1* | 7/2017 | Schmid .................. B60K 28/10 |
| 2017/0334453 | A1 | 11/2017 | Mimura et al. |
| 2018/0113454 | A1 | 4/2018 | Emura et al. |
| 2019/0049955 | A1* | 2/2019 | Yabuuchi ............. A61B 5/1128 |
| 2019/0113930 | A1* | 4/2019 | Mimura ............... B60W 30/10 |
| 2019/0118831 | A1* | 4/2019 | Mimura ............... B60W 30/00 |

(Continued)

FOREIGN PATENT DOCUMENTS

| JP | 2007269312 A | 10/2007 |
| JP | 2017001563 A | 1/2017 |

(Continued)

*Primary Examiner* — James J Lee
*Assistant Examiner* — Tawri M McAndrews
(74) *Attorney, Agent, or Firm* — Harness, Dickey & Pierce, P.L.C.

(57) ABSTRACT

A driving takeover apparatus is configured to execute a takeover from an automated driving to a manual driving by a driver in response to, during the automated driving, (i) a current operation amount by the driver to an operation target is within a takeover permissible range set according to a required operation amount to the operation target to generate a takeover control amount, and (ii) a takeover operation device is operated.

9 Claims, 5 Drawing Sheets

(56) References Cited

U.S. PATENT DOCUMENTS

| | | | | |
|---|---|---|---|---|
| 2020/0189617 | A1* | 6/2020 | Takada | G01C 21/34 |
| 2020/0231181 | A1* | 7/2020 | Miyahara | B62D 15/025 |
| 2021/0080949 | A1* | 3/2021 | Takeda | B62D 1/06 |
| 2022/0009524 | A1* | 1/2022 | Oba | B60W 40/06 |

FOREIGN PATENT DOCUMENTS

| | | | |
|---|---|---|---|
| JP | 2017207885 | A | 11/2017 |
| JP | 2018052219 | A | 4/2018 |
| JP | 2019001314 | A | 1/2019 |

* cited by examiner

DRIVING TAKEOVER APPARATUS BASED ON DRIVER OPERATION AMOUNT AND TAKEOVER OPERATION

CROSS REFERENCE TO RELATED APPLICATIONS

The present application is a continuation application of International Patent Application No. PCT/JP2020/011533 filed on Mar. 16, 2020, which designated the U.S. and claims the benefit of priority from Japanese Patent Application No. 2019-055029 filed on Mar. 22, 2019. The entire disclosures of all of the above applications are incorporated herein by reference.

TECHNICAL FIELD

The present disclosure relates to a technique for controlling a takeover from an automated driving to a manual driving.

BACKGROUND

At the automated driving level 3, when the automated driving section ends or when it is difficult to continue the automated driving due to a failure of the automated driving vehicle or the like, it is necessary to let the driver take over the driving. At this time, it is necessary to take over the driving under the state where the driver is performing an appropriate driving operation so that the behavior of the vehicle does not change suddenly before and after the takeover.

For example, suppose a case where the driver needs to take over the driving while the vehicle is following a decelerating preceding vehicle and applying the brake with automated driving. In this case, it is necessary to carry out the takeover while the driver is operating the brake appropriately. In addition, suppose a case where the driver can take over the driving while the vehicle is driving uphill with automated driving. In this case, it is necessary to carry out the takeover while the driver is operating the accelerator appropriately.

SUMMARY

According to an example of the present disclosure, a driving takeover apparatus is provided as follows. The driving takeover apparatus is configured to execute a takeover from an automated driving to a manual driving by a driver in response to, during the automated driving, (i) a current operation amount by the driver to an operation target is within a takeover permissible range set according to a required operation amount to the operation target to generate a takeover control amount, and (ii) a takeover operation device is operated.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, embodiments of the present disclosure will be described with reference to the drawings.

1. First Embodiment

1-1. Configuration

Figure 1:
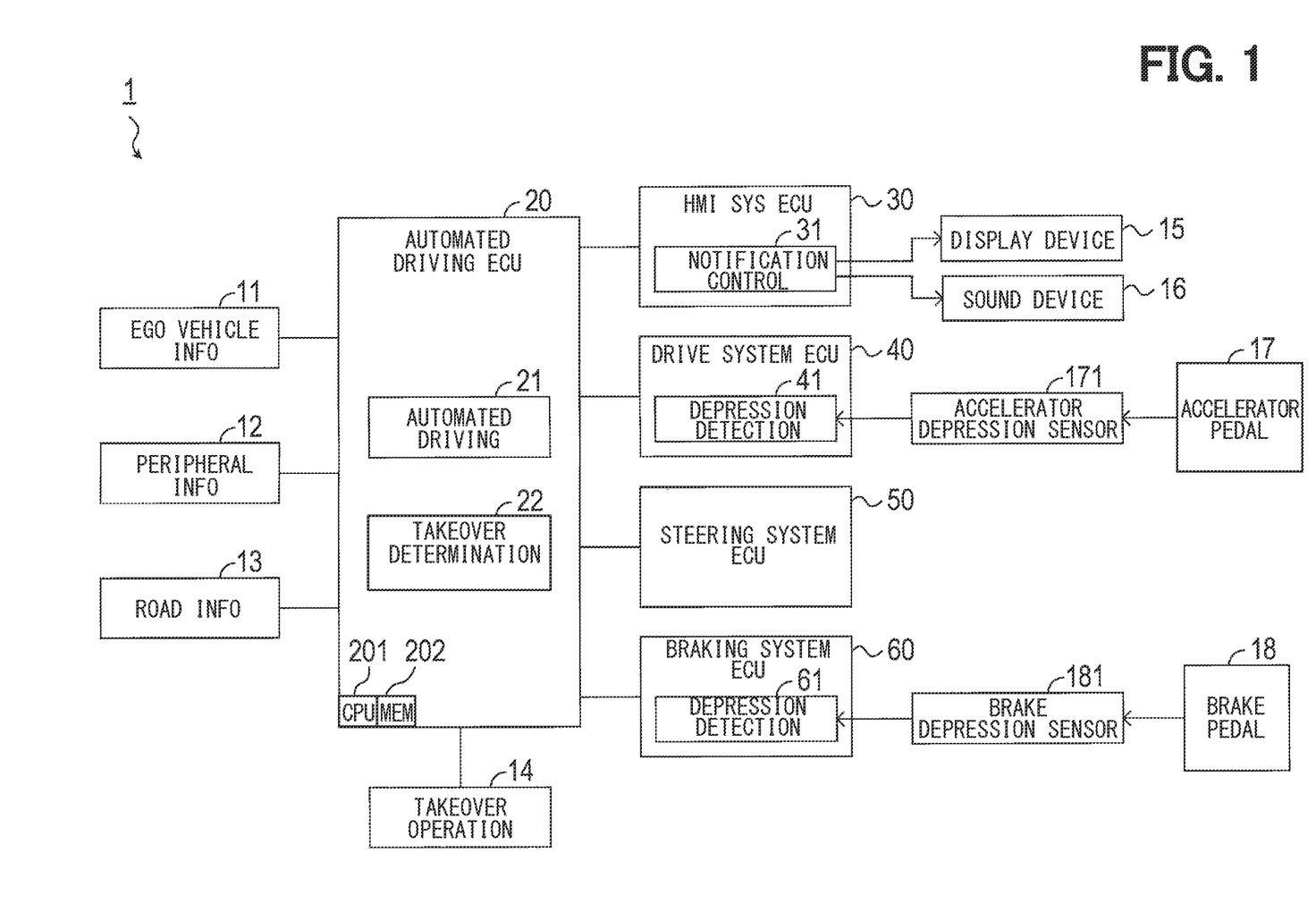
FIG. 1 is a block diagram showing a configuration of a driving takeover apparatus according to a first embodiment.

A driving takeover apparatus 1 shown in FIG. 1 includes a takeover operation device 14 and an automated driving ECU 20. The ECU is an abbreviation for "Electronic Control Unit".

The driving takeover apparatus 1 may include an ego vehicle information device 11, a peripheral information device 12, a road information device 13, a display device 15, a sound device 16, and a depression sensor 171 of an accelerator pedal 17 (hereinafter referred to as an accelerator depression sensor 171), and a depression sensor 181 of a brake pedal 18 (hereinafter referred to as a brake depression sensor 181). Further, the driving takeover apparatus 1 may include an HMI system ECU 30, a drive system ECU 40, a steering system ECU 50, and a braking system ECU 60. Hereinafter, the vehicle equipped with the driving takeover apparatus 1 is referred to as an ego vehicle. HMI is an abbreviation for Human Machine Interface.

The ego vehicle information device 11 includes a plurality of in-vehicle sensors that detect the behavior of the ego vehicle. Specifically, a wheel speed sensor, an acceleration sensor, a yaw rate sensor, and the like may be included.

The peripheral information device 12 includes a plurality of in-vehicle devices, sensors, or detectors that detect the surrounding conditions of the ego vehicle. Specifically, a camera, a millimeter wave radar, a LIDAR, and the like may be included.

The road information device 13 includes a plurality of in-vehicle devices, sensors, or detectors for obtaining information on a traveling road (hereinafter referred to as road information). Specifically, a position detection device using GNSS or the like, a navigation device that provides road information, or the like may be included.

The GNSS stands for Global Navigation Satellite System. The road information includes information necessary for estimating the behavior of the ego vehicle, such as the road shape and the road slope.

The takeover operation device 14 is a switch arranged at a position operated by the driver of the ego vehicle, and is operated at the timing of taking over from the automated driving to the manual driving. Hereinafter, the operation performed against or to the takeover operation device 14 is referred to as a takeover operation.

The display device 15 is a device that performs visual notification by displaying at a position that can be visually recognized by the driver of the ego vehicle. The display device 15 may have a dedicated screen, or may use a screen of a navigation device, a screen on which meters are displayed, a head-up display, or the like.

The sound device 16 is a device that uses hearing to notify the occupants including the driver of the ego vehicle by outputting speeches. The sound device 16 may have a dedicated speaker, or may use a speaker included in the navigation device.

The accelerator depression sensor 171 detects a depression amount of the accelerator pedal 17.

The brake depression sensor 181 detects a depression amount of the brake pedal 18.

The automated driving ECU 20 includes a microcomputer having a CPU 201 and semiconductor memories (hereinafter, memory 202) such as RAM, ROM, and flash memory. The automated driving ECU 20 includes an automated driving unit 21 and a takeover determination unit 22 as a function configuration realized by the CPU 201 executing a program. The details of the process by the automated driving unit 21 and the takeover determination unit 22 will be described later.

The HMI system ECU 30, the drive system ECU 40, the steering system ECU 50, and the braking system ECU 60 each include a microcomputer, like the automated driving ECU 20.

The HMI system ECU 30 includes at least a notification control unit 31 as a function configuration realized by the CPU executing a program. The notification control unit 31 notifies an occupant in the ego vehicle such as the driver through displaying the screen via the display device 15 and outputting the speech via the sound device 16 in accordance with the instruction from the automated driving ECU 20. In addition to notifying the occupant, the HMI system ECU 30 also receives instruction inputs from the occupant to the automated driving ECU 20 and the like.

The drive system ECU 40 includes at least a depression detection unit 41 as a function configuration realized by the CPU executing a program. The depression detection unit 41 converts the depression amount of the accelerator pedal 17, which is the detection result of the accelerator depression sensor 171, into a value of 0 to 100%, and notifies the automated driving ECU 20 as the accelerator operation amount. Further, the drive system ECU 40 controls a drive system such as an engine (i) according to an instruction from the automated driving ECU 20 during automated driving and (ii) according to an accelerator operation amount detected by the depression detection unit 41 during manual driving.

The steering system ECU 50 controls the operation of the steering system (i) according to the instruction from the automated driving ECU 20 during automated driving and (ii) according to the detection result by the steering angle sensor that detects the steering operation amount during manual driving.

The braking system ECU 60 includes at least a depression detection unit 61 as a function configuration realized by the CPU executing a program. The depression detection unit 61 converts the depression amount of the brake pedal 18 which is the detection result of the brake depression sensor 181 into a value of 0 to 100%, and notifies the automated driving ECU 20 as the brake operation amount. The braking system ECU 60 controls a braking system such as a brake (i) according to an instruction from the automated driving ECU 20 during automated driving and (ii) according to a braking operation amount detected by the depression detection unit 61 during manual driving.

1-2. Process

[1-2-1. Automatic Driving Unit]

The automated driving unit 21 starts automated driving control according to an instruction input via the HMI system ECU 30. When the automated driving control is started, the automated driving unit 21 acquires a route from the navigation device or the like to the destination of the ego vehicle. The situation of the ego vehicle and the situation around the ego vehicle are thereby determined from the information acquired from the ego vehicle information device 11, the peripheral information device 12, and the road information device 13. Further, the automated driving unit 21 executes automated driving by generating instructions to the drive system ECU 40, the steering system ECU 50, and the braking system ECU 60 according to the determined situation and the acquired route. In addition, information is provided to the driver of the ego vehicle via the HMI system ECU 30 as needed.

The automated driving unit 21 monitors the state of the ego vehicle in parallel with the automated driving control. When the end condition for ending the automated driving is satisfied, the automated driving unit 21 activates the takeover determination unit 22 to execute the driving takeover process. The end condition is, for example, when the automated driving road segment ends, when the detection accuracy by the in-vehicle sensor does not reach the level required for automated driving due to bad weather, or when a system failure occurs to make it difficult to continue automated driving. Whether or not it is an automated driving road segment is determined based on the information acquired from the road information device 13.

[1-2-2. Takeover Determination Unit]

Figure 2:
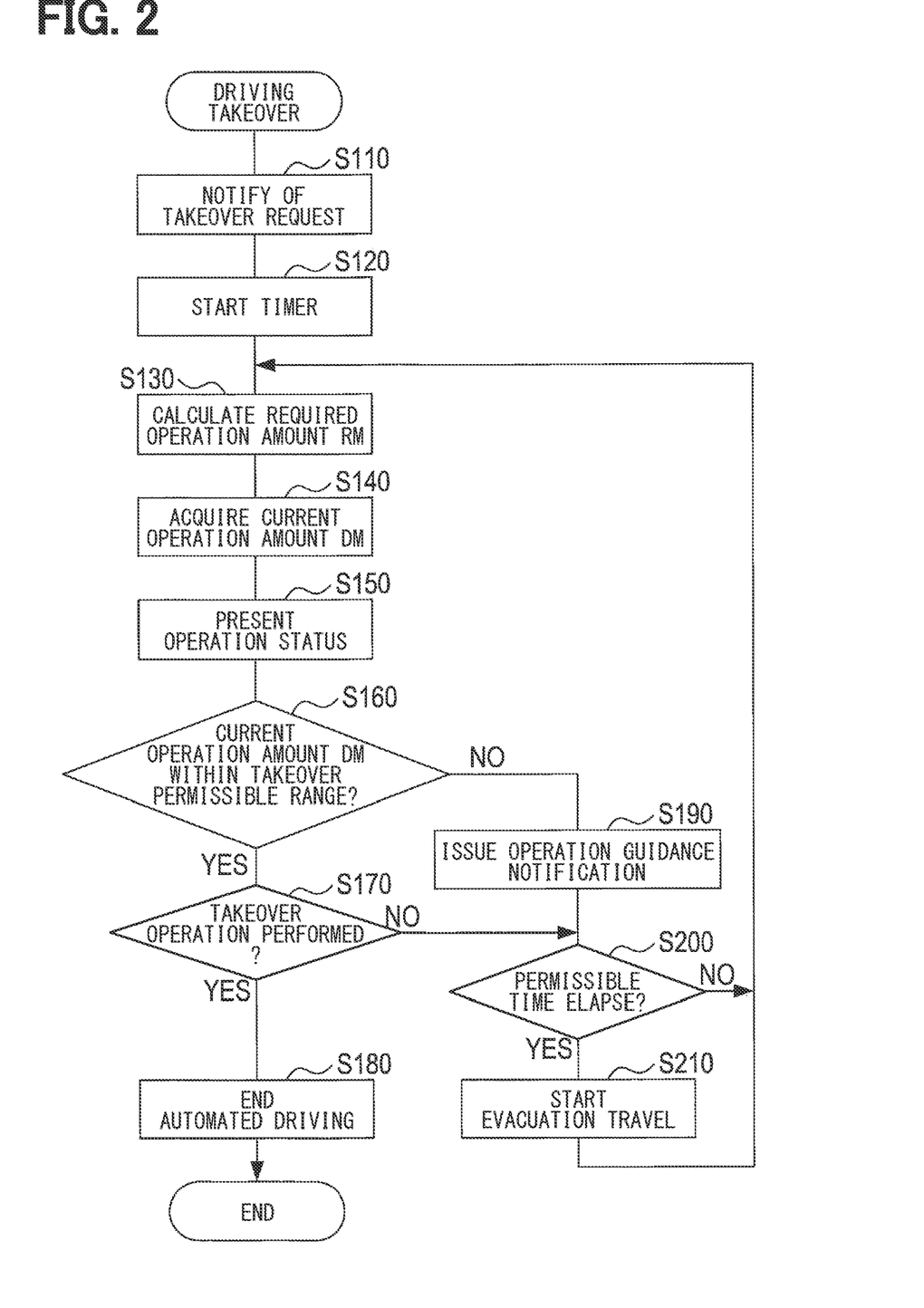
FIG. 2 is a flowchart of a driving takeover process according to the first embodiment.

Here, the driving takeover process executed by the takeover determination unit 22 will be described with reference to the flowchart of FIG. 2. As described above, the driving takeover process is started when the automated driving unit 21 determines that the end condition is satisfied.

In S110, the takeover determination unit 22 notifies the driver via the HMI system ECU 30 that the driver is requested to take over from the automated driving to the manual driving (hereinafter referred to as a takeover request). Specifically, for example, "automated driving is canceled" via the sound device 16. It is also conceivable to output a speech such as "Please depress the 'operation target'". Further, the same contents may be displayed on the display screen in the display device 15. Note that the "operation target" is an "accelerator pedal" or "brake pedal", respectively, when acceleration or deceleration is outputted, as a control amount or control target, by the automated driving unit 21 to the drive system ECU 40 or the braking system ECU 60. The operation target may correspond to a designated operation target; the control amount may correspond to a designated control amount.

In the following S120, the takeover determination unit 22 starts a timer for measuring the elapsed time since notifying the takeover request.

In the following S130, the takeover determination unit 22 calculates a required operation amount RM. The current control amount (that is, the driving amount or the braking amount) in the automated driving control carried out by the automated driving unit 21 is acquired as a takeover control amount. The required operation amount RM is the accelerator operation amount or the brake operation amount required to realize the takeover control amount.

In the following S140, the takeover determination unit 22 acquires the current operation amount DM. Specifically, when the required operation amount RM calculated in S130 is based on the driving amount, the accelerator operation amount detected by the depression detection unit 41 is acquired as the current operation amount DM. When the required operation amount RM calculated in S130 is based on the braking amount, the brake operation amount detected by the depression detection unit 61 is acquired as the current operation amount DM.

Figure 3:
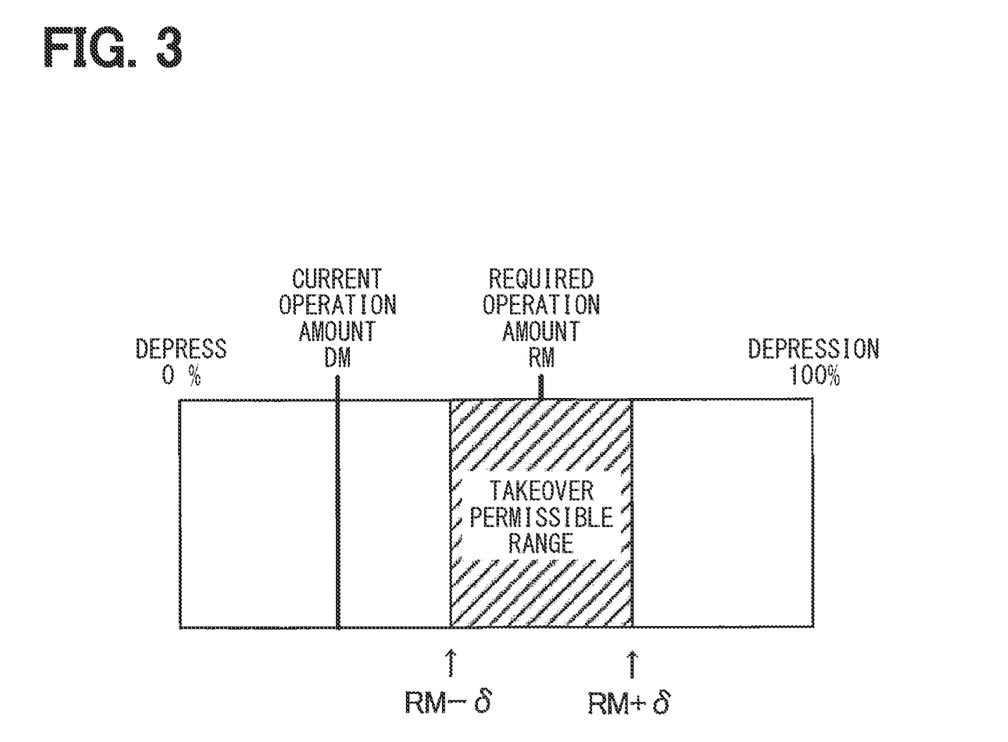
FIG. 3 is an explanatory diagram showing an example of an operation status display.

In the following S150, the takeover determination unit 22 displays the operation status indicating the relation between the required operation amount RM calculated in S130 and the current operation amount DM acquired in S140 on the display device 15 via the HMI system ECU 30. For example, as shown in FIG. 3, the operation status display is configured to display the takeover permissible range and the current operation amount DM in a band-shaped area in which the range of motion of the accelerator pedal 17 or the brake pedal 18 is expressed by 0% to 100%. The takeover permissible range is a range from (RM—δL) to (RM+δU) with the margins of error for the required operation amount RM as δL and δU, as shown by diagonal lines in FIG. 3. The current operation amount DM is shown by a thick line in FIG. 3. That is, the operation status display is a display for the driver to visually understand whether or not the current operation amount DM is within the takeover permissible range. The operation status display is also a display for the driver to visually understand what kind of pedal operation (that is, depressing or releasing) is required when the current operation amount DM is not within the takeover permissible range.

The takeover permissible range may be different depending on whether the operation amount is the accelerator operation amount or the brake operation amount. The takeover permissible range may be provided with an upper limit value and a lower limit value so that the driver does not have a difficult situation after taking over the operation.

For example, suppose that the operation amount is the brake operation amount. Here, the brake operation amount calculated based on the acceleration of the ego vehicle at the time of taking over may be set as the lower limit value; the brake operation amount calculated in consideration of the acceleration (for example, 0.5 G) corresponding to the sudden deceleration may be set as the upper limit value. In this case, δL=0 and δU>0. In other words, the takeover permissible range may be set to the range to ensure the minimum deceleration in automated driving control, and provide a larger deceleration without making the occupant feel a sudden deceleration.

Further, suppose that the operation amount is the accelerator operation amount. Here, the accelerator operation amount calculated in consideration of a predetermined acceleration range (for example, ±0.2 G) based on the acceleration of the ego vehicle at the time of taking over may be set as the lower limit value and the upper limit value. In this case, δL>0 and δU>0. That is, the takeover permissible range may be set to the range in which the acceleration change occurring in the takeover from automated driving to manual driving does not make the occupant feel uncomfortable.

In the following S160, the takeover determination unit 22 determines whether or not the current operation amount DM is within the takeover permissible range. When an affirmative determination is made in S160, that is, when it is determined that the current operation amount DM is within the takeover permissible range, the process is shifted to S170. Further, when a negative determination is made in S160, that is, when it is determined that the current operation amount DM is out of the takeover permissible range, the process is shifted to S190.

In S170, the takeover determination unit 22 determines whether or not the takeover operation is performed by the takeover operation device 14. When an affirmative determination is made in S170, that is, when the takeover operation is performed, the process is shifted to S180. When a negative determination is made in S170, that is, when the takeover operation is not performed, the process is shifted to S200.

In S180, the takeover determination unit 22 stops the automated driving control by the automated driving unit 21, executes the transition from the automated driving to the manual driving, and ends the process.

In S190, the takeover determination unit 22 issues an operation guidance notification via the HMI system ECU 30. The process is then shifted to S200. The operation guidance notification is a notification for prompting the driver to operate the pedal in a direction to reduce the difference between the current operation amount DM and the required operation amount RM so that the current operation amount DM is within the takeover permissible range. Specifically, when the current operation amount DM is less than the takeover permissible range, for example, a notification "Please depress the 'operation target'" is performed by screen display or speech. In addition, when the current operation amount DM exceeds the takeover permissible range, for example, a notification "Please loosen the depressing the 'operation target'" is performed by screen display or speech.

In S200, the takeover determination unit 22 determines whether or not the elapsed time since the notification of the takeover request was made (i.e., the measured value of the timer started in S120) exceeds a preset permissible time (for example, 10 seconds). When an affirmative determination is made in S200, that is, when the elapsed time exceeds the permissible time, it is determined that the driving takeover has failed and the process is shifted to S210. When a negative determination is made in S200, that is, when the elapsed time is within the permissible time, the process is returned to S130.

In S210, the takeover determination unit 22 causes the automated driving unit 21 to start the evacuation travel of finding a safe place and stopping the ego vehicle, and returns the process to S130.

Note that S130 corresponds to a calculation unit, S140 corresponds to an acquisition unit, S170 to S180 correspond to a takeover unit, and S150 and S190 correspond to a guidance unit.

1-3. Operation

When it becomes necessary to take over from automated driving to manual driving, the driving takeover apparatus 1 first issues a notification of the takeover request. In this notification, it is indicated whether the operation target is the accelerator pedal 17 or the brake pedal 18. Therefore, the driver can recognize the pedal to be operated according to the notification of the takeover request.

The driving takeover apparatus 1 displays an operation status indicating the relation between (i) the takeover permissible range set according to the operation status by automated driving and (ii) the current operation amount DM that changes according to the operation status of the driver for the operation target. The driving takeover apparatus 1 also issues an operation guidance notification when the current operation amount DM is not within the takeover permissible range. Therefore, the driver can recognize whether or not the operation (that is, depressing) for the operation target is sufficient by checking the operation status display. In addition, the driver can recognize the operation to be performed on the operation target by the operation guidance notification. Further, the driver can confirm the operation status display and execute the takeover operation at the timing when the current operation amount DM is within the takeover permissible range.

The driving takeover apparatus 1 stops the automated driving when the current operation amount DM is within the takeover permissible range and the takeover operation by the driver is confirmed. As a result, the takeover from the automated driving to the manual driving is executed. When the takeover operation is not performed within the permissible time after the notification of the takeover request is received, the driving takeover apparatus 1 starts the evacuation travel. However, even after the start of the evacuation travel, when the current operation amount DM is within the takeover permissible range and the takeover operation by the driver is confirmed, the automated driving is stopped. That is, the takeover from the automated driving to the manual driving is executed.

1-4. Effects

The first embodiment can provide the following effects.

(1a) In the driving takeover apparatus 1, when (i) the current operation amount DM is within the takeover permissible range and (ii) the takeover operation which is a manifestation of intention from the driver is performed, the transition is executed from the automated driving to the manual driving. That is, since the driving is taken over in a state where the current operation amount DM and the required operation amount RM are sufficiently close to each other, it is possible to suppress unexpected acceleration or deceleration during the takeover. As a result, it is possible to prevent the difficulty of manual driving from becoming high due to a sudden approach to the vehicle in front or the vehicle behind immediately after taking over the driving.

(1b) In the driving takeover apparatus 1, since the relation between the current operation amount DM and the required operation amount RM is presented to the driver by displaying the operation status, it is possible to make the driver recognize whether or not the current operation amount DM is within the takeover permissible range.

(1c) In the driving takeover apparatus 1, when the current operation amount DM is outside the takeover permissible range, the operation guidance notification is performed for guiding the driver so as to be within the takeover permissible range. Therefore, it is possible to make the driver aware of the operation to be performed in order to enable the driving to be taken over.

(1d) In the driving takeover apparatus 1, when the takeover operation is not performed by the driver within the permissible time after issuing the takeover request, the automated driving unit 21 is caused to start the evacuation travel. Therefore, for example, even when the driver cannot perform the takeover operation for some reason, the safety of the occupant in the vehicle can be ensured.

2. Second Embodiment

2-1. Main Difference from First Embodiment

The fundamental configuration of a second embodiment is similar to that of the first embodiment. Therefore, the difference therebetween will be described below. It is noted that the same reference numerals as those in the first embodiment indicate the same configuration, and refer to the preceding descriptions.

In the first embodiment described above, the current operation amount DM is guided to a value within the takeover permissible range by displaying the operation status and performing the operation guidance notification. On the other hand, the second embodiment is different from the first embodiment in that the pedal is guided by changing the range of allowance when the pedal as an operation target is operated.

Figure 4:
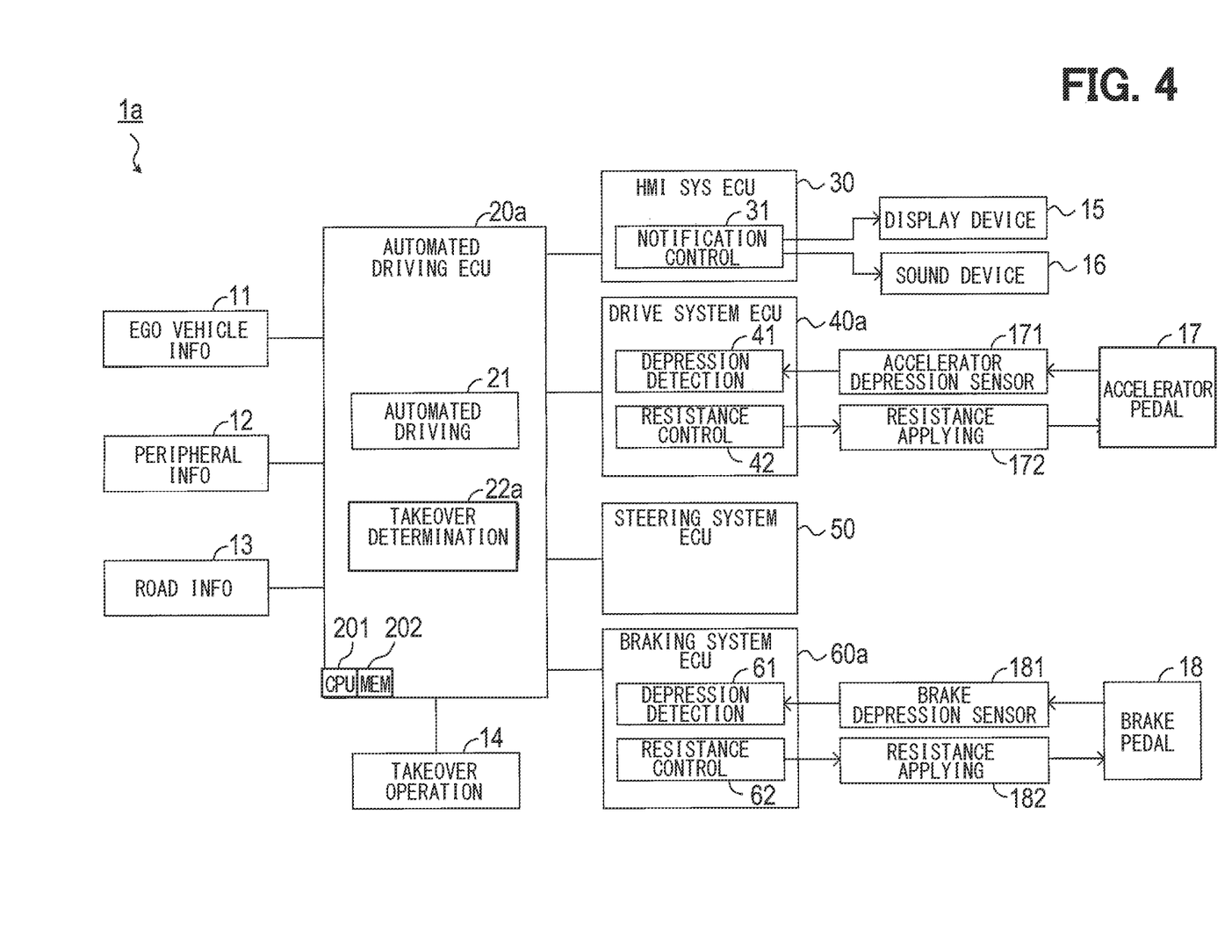
FIG. 4 is a block diagram showing a configuration of a driving takeover apparatus according to a second embodiment.

As shown in FIG. 4, the driving takeover apparatus 1a of the second embodiment includes a resistance applying mechanism 172 that applies a resistance force to the accelerator pedal 17 when the accelerator pedal 17 is depressed. Further, the driving takeover apparatus 1a further includes a resistance applying mechanism 182 that applies a resistance force to the brake pedal 18 when the brake pedal 18 is depressed. These resistance applying mechanisms 172 and 182 correspond to a resistance applying device.

The resistance applying mechanisms 172 and 182 each have the same configuration, and the resistance force is changed according to the amount of pedal depression by using a motor or the like. Here, the entire area of the depression is divided into two areas, an allowance area and an effect area. The allowance area is set so that the resistance is lower than the effect area. Further, the resistance applying mechanisms 172 and 182 are configured so that the depression amount that is the boundary between the allowance area and the effect area (hereinafter, the area boundary depression amount) can be freely changed.

That is, the accelerator pedal 17 and the brake pedal 18 can be set by the resistance applying mechanism 172 and 182 such that the pedal can be depressed up to the area boundary depression amount without applying a load, and the pedal cannot be depressed further without applying a greater load.

In addition to the configuration of the drive system ECU 40, the drive system ECU 40a further includes a resistance control unit 42 that controls the resistance applying mechanism 172 to change the area boundary depression amount of the accelerator pedal 17.

In addition to the configuration of the braking system ECU 60, the braking system ECU 60a further includes a resistance control unit 62 that controls the resistance applying mechanism 182 to change the area boundary depression amount of the brake pedal 18.

The content of the process in the takeover determination unit 22a of the automated driving ECU 20a is different from that of the first embodiment.

2-2. Process

Figure 5:
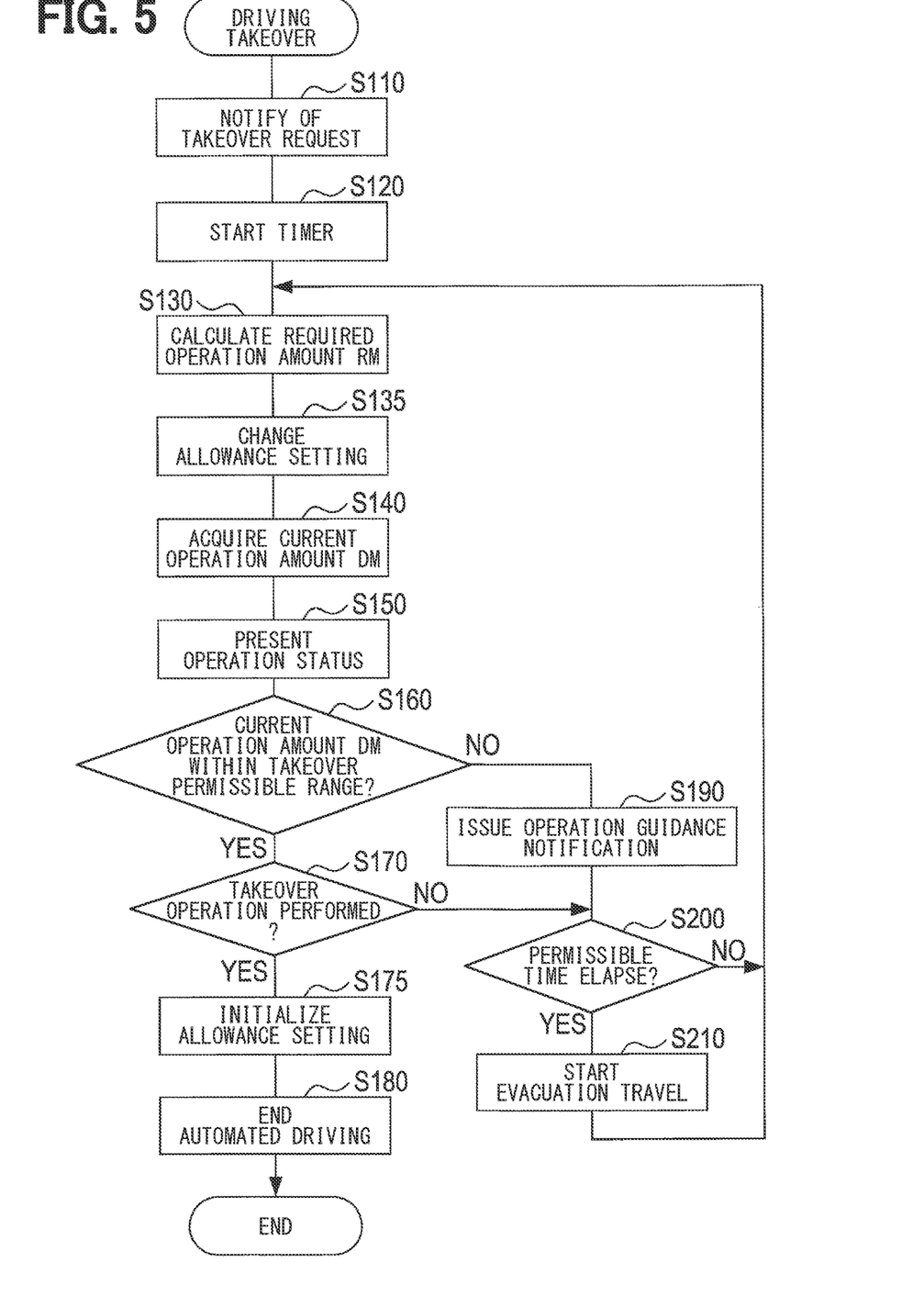
FIG. 5 is a flowchart of a driving takeover process according to the second embodiment.

The driving takeover process executed by the takeover determination unit 22a in place of the driving takeover process of the first embodiment described with reference to FIG. 2 will be described with reference to the flowchart of FIG. 5. Note that since only S135 and S175 have been added, the added steps will be described.

In the present embodiment, the takeover determination unit 22a proceeds from S130 to S135.

In S135, the takeover determination unit 22 sets the allowance of the operation target and shifts the process to S140. In addition, S135 corresponds to a guidance unit.

Specifically, the takeover determination unit 22a outputs an instruction to set the depression amount of the operation target corresponding to the required operation amount RM as the area boundary depression amount, to the resistance control unit 42 of the drive system ECU 40a or the resistance control unit 62 of the braking system ECU 60a. That is, the area boundary depression amount and the range of the allowance area are variably set according to the required operation amount RM.

Further, in the present embodiment, when the takeover determination unit 22a makes an affirmative determination in S170, the process is shifted to S175.

In S175, the takeover determination unit 22a outputs an instruction of initializing the setting of the allowance area (that is, the area boundary depression amount) to the setting at the time of manual driving prepared in advance, to the resistance control units 42 and 62. Then, the process is shifted to S180.

2-3. Effects

According to the second embodiment described in detail above, the effects (1a) to (1d) of the above-mentioned first embodiment are exhibited, and the following effects are further achieved.

(2a) In the driving takeover apparatus 1a, the area boundary depression amount, which is the boundary between the allowance area and the effect area, is set according to the required operation amount RM. Therefore, the driver can intuitively and accurately recognize the magnitude of the required operation amount RM from the sense of depressing the operation target.

In the present embodiment, the variable setting of the area boundary depression amount, the operation status display, and the operation guidance notification are all performed. However, when the area boundary depression amount is variably set, the operation status display and/or the operation guidance notification may be omitted.

3. Other Embodiments

While the embodiments of the present disclosure have been described, the present disclosure is not limited to the embodiments described above and can be modified in various manners.

(3a) Although a redundant system is not particularly mentioned in the above embodiments, the redundant system of the automated driving ECUs 20 and 20a may be provided so that the automated driving can be continued even in the event of a failure. In this case, the takeover determination unit 22 and 22a may be provided in the redundant system of the automated driving ECU 20 and 20a.

(3b) The automated driving ECU 20 and 20a and methods thereof described in the present disclosure may be implemented by a special purpose computer created by configuring a memory and a processor programmed to execute one or more particular functions embodied in computer programs. Alternatively, the automated driving ECU 20 and 20a and methods thereof described in the present disclosure may be implemented by a special purpose computer created by configuring a processor provided by one or more special purpose hardware logic circuits. Yet alternatively, the automated driving ECU 20 and 20a and methods thereof described in the present disclosure may be implemented by one or more special purpose computers created by configuring a combination of (i) a memory and a processor programmed to execute one or more particular functions embodied in computer programs and (ii) a processor provided by one or more hardware logic circuits. Further, the computer program may be stored in a computer-readable non-transitory tangible storage medium as instructions to be executed by a computer. The technique for realizing the functions of each unit included in the automated driving ECU 20, 20a does not necessarily need to include software, and all the functions may be realized using one or a plurality of hardware circuits.

(3c) A plurality of functions of one constituent element in the above embodiment may be implemented by a plurality of constituent elements, or one function of one constituent element may be implemented by a plurality of constituent elements. Further, a plurality of functions of a plurality of constituent elements may be implemented by one constituent element, or one function implemented by a plurality of constituent elements may be implemented by one constituent element. In addition, a part of the configuration of the above embodiment may be omitted. Further, at least part of the configuration of the above-described embodiment may be added to or replaced with the configuration of another embodiment described above.

(3d) In addition to the above-described driving takeover apparatus 1, 1a, the present disclosure may be realized by various features such as a system including the driving takeover apparatus as a constituent element, a program for functioning the computer to provide the driving takeover apparatus, a non-transitory tangible storage medium such as a semiconductor memory storing the program, a driving takeover method or the like.

For reference to further explain features of the present disclosure, the description is added as follows.

At the automated driving level 3, when the automated driving section ends or when it is difficult to continue the automated driving due to a failure of the automated driving vehicle or the like, it is necessary to let the driver take over the driving. At this time, it is necessary to take over the driving under the state where the driver is performing an appropriate driving operation so that the behavior of the vehicle does not change suddenly before and after the takeover.

For example, suppose a case where the driver needs to take over the driving while the vehicle is following a decelerating preceding vehicle and applying the brake with automated driving. In this case, it is necessary to carry out the takeover while the driver is operating the brake appropriately. In addition, suppose a case where the driver can take over the driving while the vehicle is driving uphill with automated driving. In this case, it is necessary to carry out the takeover while the driver is operating the accelerator appropriately.

On the other hand, there is described a technique, which acquires brake information during automated driving and instructs the driver to depress by a required brake amount at the time of taking over based on the acquired information.

However, as a result of detailed examination by the inventor, the following problems have been found in the above technique. That is, in the above technique, only by presenting the required amount of brake operation to the driver, the takeover is performed regardless of whether or not the driver has performed the required amount of brake operation. For this reason, there is a possibility that unexpected acceleration or deceleration may occur immediately after the takeover, the distance with the preceding vehicle or the following vehicle may be shortened, and the difficulty of driving after the takeover may increase.

It is thus desired to provide a technique for improving safety at the time of taking over from automated driving to manual driving.

An aspect of the present disclosure described herein is set forth in the following clauses.

According to an aspect of the present disclosure, a driving takeover apparatus is provided to include an automated driving unit, a takeover operation device, an acquisition unit, a calculation unit, and a takeover unit.

The automated driving unit is configured to execute a control of an automated driving of a vehicle. The takeover operation device is configured to receive an operation by a driver of the vehicle in a takeover from the automated driving whose control executed by the automated driving unit to a manual driving by the driver. Herein, a designated control amount is previously designated from control amounts required to control driving of the vehicle, and a designated operation target is designated to be operated by the driver in order to generate the designated control amount during the manual driving. The acquisition unit is configured to acquire a current operation amount by the driver to the designated operation target. The calculation unit is configured to calculate a required operation amount to the designated operation target to generate a takeover control amount, the takeover control amount being defined as the designated control amount generated by the automated driving unit. The takeover unit is configured to stop the control executed by the automated driving unit in response to, during the control executed by the automated driving unit, (i) the current operation amount acquired by the acquisition unit is within a takeover permissible range set according to the required operation amount calculated by the calculation unit, and (ii) the takeover operation device is operated. The takeover from the automated driving to the manual driving is thereby executed.

According to such a configuration, since the driving is taken over in a state where the current operation amount and the required operation amount are sufficiently close to each other, it is possible to suppress unexpected acceleration or deceleration at the time of takeover. As a result, it is possible to prevent the difficulty of manual driving from becoming high due to a sudden approach to the vehicle in front or the vehicle behind immediately after taking over the driving.

What is claimed is:

1. A driving takeover apparatus comprising:
    an automated driving unit configured to generate a control amount necessary to an automated driving of a vehicle and execute a control of the automated driving of the vehicle;
    a takeover operation device configured to receive an operation by a driver of the vehicle in a takeover from the automated driving whose control executed by the automated driving unit to a manual driving by the driver;
    a calculation unit configured to calculate a required operation amount to an operation target to generate the control amount necessary to the automated driving, as a takeover control amount;
    an acquisition unit configured to acquire a current operation amount by the driver to the operation target;
    a takeover unit configured to execute the takeover from the automated driving to the manual driving by stopping the control executed by the automated driving unit in response to the takeover operation device being operated while both (i) the automated driving unit is executing the control of the automated driving, and (ii) the current operation amount acquired by the acquisition unit is within a takeover permissible range set according to the required operation amount calculated by the calculation unit;
    a guidance unit configured to quide the driver to operate the operation target so as to enable the current operation amount to be within the takeover permissible range;
    a resistance applying mechanism configured to generate, during an operation to the operation target, a resistance force against the operation;
    a request notification unit configured to issue, to the driver, a notification that requests the driver to take over from the automated driving to the manual driving in response to the automated driving unit determining that an end condition for ending the automated driving is satisfied; and
    an evacuation execution unit configured to cause the automated driving unit to perform an evacuation travel to find a safe place and stop the vehicle in response to the takeover operation unit being not operated even after a preset permissible time has elapsed since the notification was issued by the request notification unit;
    wherein the guidance unit is further configured to change the resistance force generated by the resistance applying mechanism before and after the required operation amount.

2. The driving takeover apparatus according to claim 1, wherein:
    the guidance unit is further configured to perform a notification to prompt the driver to perform an operation to the operation target in a direction of reducing a difference between the current operation amount and the required operation amount.

3. The driving takeover apparatus according to claim 1, wherein:
    the operation target includes a brake pedal, or an accelerator pedal, or both of the brake pedal and the accelerator pedal.

4. The driving takeover apparatus according to claim 1, wherein the takeover unit executes the takeover from the automated driving to the manual driving while the current operation amount acquired by the acquisition unit is within the takeover permissible range.

5. The driving takeover apparatus according to claim 1, wherein the takeover unit executes the takeover from the automated driving to the manual driving after the current operation amount acquired by the acquisition unit is within the takeover permissible range.

6. The driving takeover apparatus according to claim 1, wherein the takeover unit executes the takeover from the automated driving to the manual driving in response to the current operation amount acquired by the acquisition unit being within the takeover permissible range.

7. The driving takeover apparatus according to claim 1, wherein the takeover unit additionally executes the takeover from the automated driving to the manual driving in response to a vehicle system failure.

8. A driving takeover apparatus comprising:
    an automated driving unit configured to generate a control amount necessary to an automated driving of a vehicle and execute a control of the automated driving of the vehicle;
    a takeover operation device configured to receive an operation by a driver of the vehicle in a takeover from the automated driving whose control executed by the automated driving unit to a manual driving by the driver;
    a calculation unit configured to calculate a required operation amount to an operation target to generate the control amount necessary to the automated driving, as a takeover control amount;
    an acquisition unit configured to acquire a current operation amount by the driver to the operation target;

a takeover unit configured to execute the takeover from the automated driving to the manual driving by stopping the control executed by the automated driving unit in response to the takeover operation device being operated while both (i) the automated driving unit is executing the control of the automated driving, and (ii) the current operation amount acquired by the acquisition unit is within a takeover permissible range set according to the required operation amount calculated by the calculation unit;

a guidance unit configured to guide the driver to operate the operation target so as to enable the current operation amount to be within the takeover permissible range;

a resistance applying mechanism configured to generate, during an operation to the operation target, a resistance force against the operation, wherein:

the guidance unit is further configured to change the resistance force generated by the resistance applying mechanism before and after the required operation amount; and the takeover unit additionally executes the takeover from the automated driving to the manual driving in response to a vehicle system failure.

9. A driving takeover apparatus comprising:

an automated driving unit configured to generate a control amount necessary to an automated driving of a vehicle and execute a control of the automated driving of the vehicle;

a takeover operation device configured to receive an operation by a driver of the vehicle in a takeover from the automated driving whose control executed by the automated driving unit to a manual driving by the driver;

a calculation unit configured to calculate a required operation amount to an operation target to generate the control amount necessary to the automated driving, as a takeover control amount;

an acquisition unit configured to acquire a current operation amount by the driver to the operation target;

a takeover unit configured to execute the takeover from the automated driving to the manual driving by stopping the control executed by the automated driving unit in response to the takeover operation device being operated while both (i) the automated driving unit is executing the control of the automated driving, and (ii) the current operation amount acquired by the acquisition unit is within a takeover permissible range set according to the required operation amount calculated by the calculation unit;

a request notification unit configured to issue, to the driver, a notification that requests the driver to take over from the automated driving to the manual driving in response to the automated driving unit determining that an end condition for ending the automated driving is satisfied; and an evacuation execution unit configured to cause the automated driving unit to perform an evacuation travel to find a safe place and stop the vehicle in response to the takeover operation unit being not operated even after a preset permissible time has elapsed since the notification was issued by the request notification unit;

wherein the takeover unit additionally executes the takeover from the automated driving to the manual driving in response to a vehicle system failure.

* * * * *